United States Patent
Rossi (10) Patent No.: US 11,095,638 B2
(45) Date of Patent: Aug. 17, 2021

(54) ACCESS SECURITY IN COMPUTER NETWORKS

(71) Applicant: SSH Communications Security OYJ, Helsinki (FI)

(72) Inventor: Markku Rossi, Jarvenpaa (FI)

(73) Assignee: SSH Communications Security OYJ, Helsinki (FI)

( * ) Notice: Subject to any disclaimer, the term of this patent is extended or adjusted under 35 U.S.C. 154(b) by 288 days.

(21) Appl. No.: 15/837,271

(22) Filed: Dec. 11, 2017

(65) Prior Publication Data

US 2019/0182240 A1    Jun. 13, 2019

(51) Int. Cl.

| | |
|---|---|
| *H04L 29/06* | (2006.01) |
| *G06F 21/34* | (2013.01) |
| *G06Q 20/38* | (2012.01) |
| *G06F 21/33* | (2013.01) |
| *G06Q 20/34* | (2012.01) |
| *H04W 12/42* | (2021.01) |
| *H04W 12/069* | (2021.01) |
| *H04L 9/30* | (2006.01) |
| *H04L 9/32* | (2006.01) |

(52) U.S. Cl.
CPC .......... *H04L 63/0853* (2013.01); *G06F 21/33* (2013.01); *G06F 21/34* (2013.01); *G06Q 20/351* (2013.01); *G06Q 20/3821* (2013.01); *H04L 9/30* (2013.01); *H04L 9/321* (2013.01); *H04L 9/3228* (2013.01); *H04L 9/3234* (2013.01); *H04L 63/0823* (2013.01); *H04W 12/069* (2021.01); *H04W 12/42* (2021.01)

(58) Field of Classification Search
CPC ............. H04L 63/0853; H04L 63/0823; H04L 9/3263; H04L 9/3234; H04L 9/30; H04L 9/3231; H04L 9/321; G06Q 20/3821; G06Q 20/351; H04W 12/00401; H04W 12/0609; G06F 21/33; G06F 21/34
USPC .......................................................... 713/156
See application file for complete search history.

(56) References Cited

U.S. PATENT DOCUMENTS

| | | |
|---|---|---|
| 6,367,009 B1 | 4/2002 | Davis et al. |
| 7,506,368 B1 | 3/2009 | Kersey et al. |
| 8,015,594 B2 | 9/2011 | Salowey et al. |
| 8,132,242 B1 * | 3/2012 | Wu ..................... H04L 63/0884 726/8 |
| 8,185,933 B1 | 5/2012 | Palmer |
| 8,214,884 B2 | 7/2012 | Xia et al. |
| 8,341,718 B2 | 12/2012 | Chow et al. |
| 8,402,514 B1 | 3/2013 | Thompson et al. |

(Continued)

OTHER PUBLICATIONS

NPL Search Results (Year: 2019).*

(Continued)

*Primary Examiner* — Syed A Zaidi
(74) *Attorney, Agent, or Firm* — Banner & Witcoff, Ltd.

(57) ABSTRACT

A virtual smart card entity enabling a data processing apparatus to request for access to at least one service provider host in the computer network is disclosed. A credential management server provides credential information associated with the virtual smart card entity to the data processing apparatus where after the virtual smart card entity is configured according to the credential information. The data processing apparatus can then send a request for access to at least one service provider host using the configured virtual smart card entity.

24 Claims, 4 Drawing Sheets

(56) References Cited

U.S. PATENT DOCUMENTS

| | | | |
|---|---|---|---|
| 8,539,562 B2 | 9/2013 | Bolik et al. | |
| 8,843,750 B1 | 9/2014 | Sokolov | |
| 9,369,282 B2 | 6/2016 | Pal | |
| 9,413,753 B2* | 8/2016 | Dietrich | H04L 63/0815 |
| 2002/0080190 A1* | 6/2002 | Hamann | G06F 11/1435 |
| | | | 715/810 |
| 2003/0037264 A1* | 2/2003 | Ezaki | G06F 21/32 |
| | | | 726/21 |
| 2003/0076961 A1* | 4/2003 | Kim | H04L 9/006 |
| | | | 380/282 |
| 2003/0120610 A1 | 6/2003 | Hamber | |
| 2004/0268152 A1 | 12/2004 | Xia et al. | |
| 2005/0283608 A1 | 12/2005 | Halcrow et al. | |
| 2006/0248347 A1 | 11/2006 | Smith et al. | |
| 2007/0157021 A1* | 7/2007 | Whitfield | G06Q 20/3829 |
| | | | 713/156 |
| 2008/0028206 A1* | 1/2008 | Sicard | H04L 63/0407 |
| | | | 713/156 |
| 2008/0028235 A1 | 1/2008 | Smith et al. | |
| 2008/0058014 A1* | 3/2008 | Khan | G06Q 20/3278 |
| | | | 455/558 |
| 2008/0060055 A1 | 3/2008 | Lau | |
| 2008/0126794 A1 | 5/2008 | Wang et al. | |
| 2009/0037729 A1 | 2/2009 | Smith et al. | |
| 2009/0132813 A1* | 5/2009 | Schibuk | G06Q 20/223 |
| | | | 713/158 |
| 2012/0204245 A1* | 8/2012 | Ting | H04L 9/3228 |
| | | | 726/6 |
| 2013/0041830 A1* | 2/2013 | Singh | G06Q 20/3825 |
| | | | 705/65 |
| 2013/0259234 A1 | 10/2013 | Acar et al. | |
| 2014/0040139 A1* | 2/2014 | Brudnicki | G06Q 20/3278 |
| | | | 705/44 |
| 2014/0337930 A1* | 11/2014 | Hoyos | G06F 21/34 |
| | | | 726/4 |
| 2015/0086009 A1 | 3/2015 | Harjula et al. | |
| 2016/0094546 A1* | 3/2016 | Innes | G06F 21/33 |
| | | | 713/156 |
| 2016/0183087 A1 | 6/2016 | Lehtinen et al. | |
| 2016/0261409 A1 | 9/2016 | French et al. | |
| 2017/0185991 A1* | 6/2017 | Park | H04W 4/023 |
| 2018/0020353 A1 | 1/2018 | Bhandaru et al. | |
| 2018/0167208 A1 | 6/2018 | Le Saint et al. | |

OTHER PUBLICATIONS

NPL Search Terms (Year: 2020).*
NPL Search Terms (Year: 2021).*
Apr. 17, 2018 (EP) European Search Report—App. 17203651.9.
Apr. 18, 2018 (EP) European Search Report—App. 17203652.7.
Apr. 19, 2018 (EP) Search Report—App. 17203654.3.
Jul. 12, 2018 U.S. Non-Final Office Action—U.S. Appl. No. 15/361,690.
Jun. 29, 2018 U.S. Non-Final Office Action—U.S. Appl. No. 15/361,672.
Nov. 2, 2018 U.S. Non-Final Office Action—U.S. Appl. No. 15/361,707.
Jan. 25, 2019 U.S. Final Office Action—U.S. Appl. No. 15/361,690.
Jan. 11, 2019 U.S. Final Office Action—U.S. Appl. No. 15/361,372.
Berzano, Dario, "SSH Autehntiocation Using Brid Credentials," Istituto Nazionale di Fisica Nucleare, Nov. 30, 2012, retrieved from http://web.infn.it/CCR/images/stories/upload_file/note_ccr/infn-12-20_42.pdf <https://protect-us.mimecast.com/s/QWcjCDkwRxi5W7P3FWIO03>, 9 pages.
Sharma, Pranav Kumar, "Short-Lived Certificates as a Mobile Authenitication Method," Master's Thesis, Jun. 26, 2009, Helsinki University of Technology, retrieve from http://nordsecmob.aalto.fi/en/publications/theses_2009/thesis_sharma.pdf <https://protect-us.mimecast.com/s/357LCERKlyi3zwPpFw7nDp>, 79 pages.
Kolano, Paul Z., "Mesh: Secure, Lightweight Grid Middleware Using Existing SSH Infrastructure," SACMAT '07, Jun. 20-22, 2007, retrieved from https://pkolano_githubio/papers/sacmat07.pdf, 10 pages.
Apr. 11, 2019 (EP) Extended European Search Report—App. 18211067.6.
May 30, 2019 U.S. Non-Final Office Action—U.S. Appl. No. 15/361,690.
Jan. 15, 2020 (EP) Communication pursuant to Aritcle 94(3) EPC—App. 18211067.6.
May 15, 2019 U.S. Final Office Action—U.S. Appl. No. 15/361,707.
Jun. 3, 2019 U.S. Final Office Action—U.S. Appl. No. 15/361,707.
Jun. 3, 2019 U.S. Non-Final Office Action—U.S. Appl. No. 15/361,672.
Jan. 9, 2020 U.S. Final Office Action—U.S. Appl. No. 15/361,672.
Nov. 26, 2019 U.S. Final Office Action—U.S. Appl. No. 15/361,690.
May 28, 2020 U.S. Non- Final Office Action—U.S. Appl. No. 15/361,690.
Jun. 1, 2020 U.S. Notice of Allowance—U.S. Appl. No. 15/361,672.

* cited by examiner

Fig. 4

ACCESS SECURITY IN COMPUTER NETWORKS

FIELD OF THE INVENTION

This disclosure relates to access security in computer networks. More specific aspects relate to providing security for requests to access services via a computer network system.

BACKGROUND

A computer network system typically comprises computing devices, routers, gateways and other equipment for enabling communication of data between communicating devices such as user terminal devices. Physical computing devices are often called hosts. A host may also be a virtual computing device or a container, for example a Linux™ container or equivalent within a physical computing device. Each host may comprise or be associated with one or more user accounts, processes, and/or files.

A user can access a host providing one or more services by means of a user device configured for communication in the computer network system. Users may wish to access hosts in a computer network for various reasons. Various arrangements for accessing hosts and other entities in a computer network system can be configured. Non-limiting examples of access systems include web-based access, security protocol (e.g. Secure Shell protocol; SSH) based access, file transfer access, remote procedure call access, and/or software upgrade access.

Regardless of the access method used security can become a concern. Unauthorised access poses a serious data security risk. Various solutions for enhancing data security have been suggested. A security solution is based on use of smart cards. Smart cards can be used in security functions such as personal identification and authorization, authentication, secure data storage and application processing and so on. A smart card is a physical entity, typically a plastic card, comprising an embedded or integrated circuit (a "chip"). Hence the smart cards are often called chip cards or integrated circuit cards (ICC). The necessary security credentials are securely stored in the circuitry of the smart card. Once installed, it can be difficult and burdensome to change the credentials of the card.

Use of a smart card requires access to an appropriate smart card reader. Smart cards can be adapted for use in contact or contactless readers, or both. Conventionally a user wanting to access a service requiring use of a smart card has had to insert his smart card into a slot in a reader connected to the host. Convenience of use of the card has been somewhat improved by the contactless readers where the user only needs to "tap" the reader or bring the card in close proximity to the reader. However, regardless of the type a physical chip card and a reader at the location where the cards is used is needed. Another inconvenience relates to the way the smart cards are issued; the physical cards have to be somehow delivered to the user. This may take too much time for using some of the services available over a network, and may not enable use of e.g. one-off or short life-time security credentials.

It is noted that the above discussed issues are not limited to any particular communication protocol and data processing apparatus but may occur in any computerised system where smart cards are used to enhance data security.

Embodiments of the invention aim to address one or several of the above issues.

SUMMARY

In accordance with an aspect there is provided a data processing apparatus for use in a computer network, the data processing apparatus comprising at least one processor, and at least one memory including computer program code, wherein the at least one memory and the computer program code are configured, with the at least one processor, to provide a virtual smart card entity to enable a user of the data processing apparatus to request for access to at least one service provider host in the computer network, receive, from a credential management server, credential information associated with the virtual smart card entity, configure the virtual smart card entity according to the received credential information, and send a request for access to the at least one service provider host using the configured virtual smart card entity.

In accordance with an aspect there is provided a method for access control in a computer network, the method comprising: creating a virtual smart card entity in a client host to enable secure access to at least one service provider host in the computer network, receiving, at the client host from a credential management server, credential information associated with the virtual smart card entity, configuring the virtual smart card entity according to the received credential information, and sending from the client host a request for access to the at least one so service provider host using credential information from the configured virtual smart card entity.

In accordance with an aspect there is provided a virtual smart card entity for a client device, the virtual smart card entity being configured for access control in a computer network and comprising: a credential information storage, and at least one interface for input of credential information received by the client device from a credential management server, wherein credential information stored in the credential information storage is configurable according to credential information received from the credential management server, and the virtual smart card entity is configurable based on the received credential information for use by the client device in association with sending a request for access to at least one service provider server.

In accordance with a more specific aspect the credential information comprises a certificate issued by a certificate authority. The credential information may also, or alternatively comprise at least one use restriction on a credential. The credential information may be arranged to restrict use of a credential in relation to at least one of lifetime of the credential, number of times the credential can be used, geographical location of use of the credential, IP address associated with the use of the credential, time of use of the credential, type of the request for access where the credential is used, and type of the service requested using the credential.

The credential information may be send from the configured virtual smart card entity to the at least one service provider host. A public key associated with the data processing apparatus may be delivered with the credential information to the at least one service provider host.

At least one authentication parameter may be used for authentication to the credential management server to obtain said certificate information from the credential management server. The at least one authentication parameter can be ephemeral. An ephemeral key pair may be generated for the authentication.

Credential information may be requested from the credential management server for each new request for access. Credential information stored in the virtual smart card can be reconfigurable for each new request for access.

Time limited authenticators and time limited certificates may be used for requests for access.

A computer readable media comprising program code for causing a processor to perform instructions for a security method in a host device requesting for access in a computer network as described herein may also be provided.

Certain more detailed aspects are evident from the detailed description.

SUMMARY OF DRAWINGS

Various exemplifying embodiments of the invention are illustrated by the attached drawings. Steps and elements may be reordered, omitted, and combined to form new embodiments, and any step indicated as performed may be caused to be performed by another device or module. In the Figures

DETAILED DESCRIPTION

Figure 1:
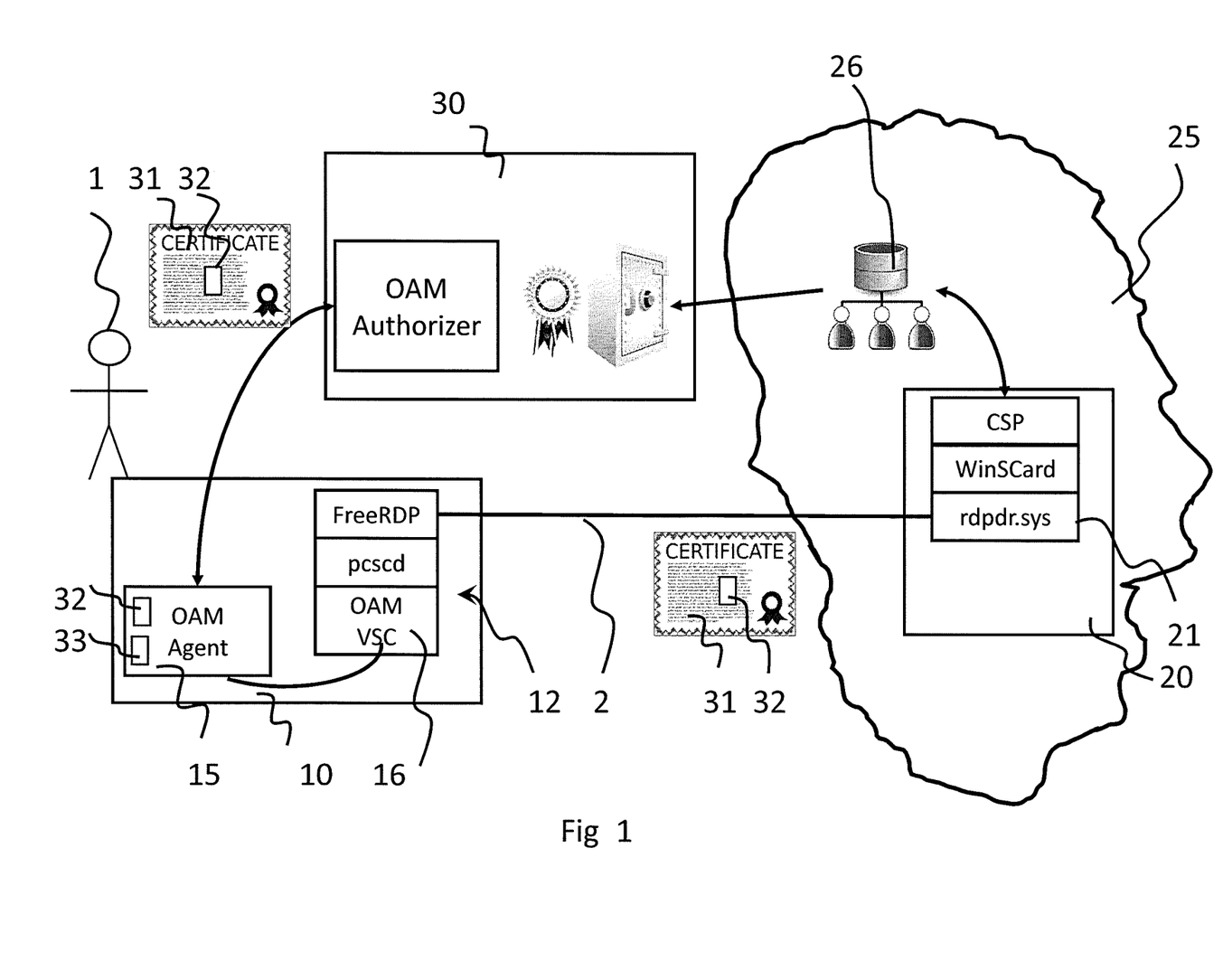
FIG. 1 illustrates an example of a network where an aspect of the invention can be embodied.

FIG. 1 shows an example of an architecture for a computer network system where some of the herein described aspects may be embodied. More particularly, FIG. 1 shows an example of an aspect where a virtual smart card (VSC) entity at a user terminal device provides a security function between hosts and devices capable of accessing the hosts. The virtual smart card can be configured on demand each time a need to access a server host or the like is determined.

In this particular example user 1 accesses, using his/hers user device 10, a host 20. The access path between the client and server hosts via the network is indicated by line 2 from the user device, or client host 10 to the server host 20. The host may comprise a host server apparatus arranged to provide one or more services via the computer network in a per se known manner. In this description the term server host refers to an entity which can be accessed by a client host, or the user device 10 of FIG. 1, via a network. The server apparatus can comprise, for example, a Windows® server or the like. The server apparatus can be adapted to operate in accordance with protocols providing conventional access handling based on physical smart cards. An example is Windows® Remote Desktop Connection and Remote Desktop Protocol (RDP). In accordance with an example smart card information can be exchanged between relevant apparatus according to an ephemeral X.509 RDP authentication flow.

The accessed server host 20 can provide one or more of a wide variety of services for the user via the network.

A server host may be provided, e.g., by a server or another physical data processing entity. A server host may also be provided in virtualized environment based on cloud computing.

The host server apparatus 20 is shown to be located in a local network. This network is called below the accessed network 25. In the example of FIG. 1 the accessed network 25 also comprises a domain controller 26. However, this is not necessary in all access scenarios.

The user device 10, or client host, may comprises a mobile device adapted for communication over air interface. At least a part of the connection between the user device 10 and the server hosts 20 can thus be provided over a wireless interface. For example, the user device may be provided wireless access to the communication network. A wireless connection to the network can be provided via a base station based on e.g., wireless local area network (WLAN), GSM/EDGE/HSPA, 3G, 4G, 5G, or WiMAX standards, and/or optical and near-field networks, or any future development of wireless standards. The user device may also comprise a computer device that is connected to the network via fixed line connection.

A communication network can comprise, for example, an Intranet of an enterprise or another organization, or a broader public network such as the Internet. The network can be e.g. an IPv4 (Internet Protocol version 4) or IPv6 (Internet Protocol version 6) based network. The network system may comprise one or more data networks.

FIG. 1 shows schematically a virtual smart card (VSC) entity 16 provided at the user device 10. The VSC comprises a data entity for use in controlling access to at least one service by a service provider computer apparatus in a computer network. The virtual smart card (VSC) entity 16 can be provided as a part of an access handling module 12 where the conventional driver for a physical smart card reader is replaced by the virtual smart card reader 16.

According to a possibility the access handling module provides drivers for both a physical smart card reader and a virtual smart card.

The access handling module at the user device can be arranged to handle access requests based on trusted security credentials issued by an authentication center after an authentication procedure. The authentication procedure can be based on exchange of at least one authenticator, for example based on an authentication procedure involving use of public and private keys or symmetric keys.

The authentication center is referred to below as credential manager and denoted by 30 in FIG. 1. The credential manager can comprise a server or a group of servers configured to manage credential information associated with virtual smart cards. The credential manager is provided as a separate security device. The credential manager may comprise a certificate authority (CA) function. A certificate authority (CA) provides a certificate issuing functionality of the network system. The credential information may comprise e.g. certificates. Information such as use restrictions and other policy information related to the certificates may be provided.

Apparatus such as servers and user terminals connected to the network can be configured to request for certificates and other information from the credential manager. The security device such as a certificate authority (CA) can communicate with other devices e.g. to authenticate users and get additional information. Additional information may comprise, for example, group information and trust relationship information. The security device can further implement policy decisions. A policy decision can include, inter alia, how users are authenticated and/or authorised, how user groups map to principals, and which restrictions, options, extensions and so forth are included in the certificate.

According to an embodiment data processing apparatus of a user can be arranged to provide a virtual smart card entity to enable user 1 using his/hers terminal device 10 comprising the apparatus to access at least one service provided by service provider apparatus 20 in the computer network. The apparatus can receive, from the credential management server, credential information associated with the virtual smart card entity and configure the virtual smart card entity according to the received credential information. The process for requesting for the credential information can involve authentication procedure between the user apparatus and credential manager.

A request for access to the at least one service can then be sent together with the configured virtual smart card entity to an access granting entity interfacing the credential management server. The access granting entity can then check the validity of the credential information on the smart card entity to determine whether to allow the request and grant the requested access.

The credential information can comprise a certificate 31 issued by a certificate authority such as the CA 30. Credential information may also comprise at least one use restriction on a credential such as a certificate. For example, the credential information can comprise a lifetime limitation of a credential. By setting a limited lifetime virtual smart card can be configured to provide an ephemeral access tool. For example, an ephemeral certificate may be issued that is only valid for e.g. 2 minutes. A short lifetime, such as a lifetime of only a few minutes can be used to reduce and prevent security risks caused by compromised security certificates.

The credential information may also comprise a limitation on the number of times a credential can be used. Other limitations, such as geographical limitations allowing and/or disallowing use in certain locations can also be set on the credentials. Geographical location of the user device may be determined e.g. based on a positioning system of the device such as smartphone. Other examples of limitations include limitations based on the IP address of the user device and/or the server host, date and/or time of access, type of service requested and so on.

The data processing apparatus of the user device may also be configured to use a key of a key pair to obtain an ephemeral or otherwise restricted certificate or other credential from the credential management server. The key pair can be configured to be ephemeral.

FIG. 1 shows schematically a public key 32 and a private key 33 pair for use in the example. The user device sends its public key 32 to the certificate manager, for example during authentication. The certificate manager can authenticate the user device based on appropriate authentication parameters. The user authentication to the certificate manager may be provided based on parameters such as username and password, Windows™ SSO token (Kerberos SSO), or use any other methods for secure authentication of the user 1 to the certificate manager/authentication server 30. Any appropriate authentication procedure can be used to authenticate the user so that the certificate manager 30 can then issue a certificate 31 for the user.

After authentication the certificate manager can return the public key 32 it received from the user device together with the certificate 31. The user device may perform a check on the received certificate 31 based on the public and private keys 32, 33.

The data processing apparatus of the terminal device can be configured to have an agent function to request for credential information using authenticators such as public and private keys from the credential management server such as the CA apparatus 30. In FIG. 1 the arrangement to obtain the credentials is shown to comprise an on-demand access manager agent 15.

The agent entity 15 at the user device 10 may comprise e.g. a Secure Shell (SSH) agent. The agent is configured to, in response to receiving input from user 1 for a request for a service by a service provider host, create an ephemeral keypair, or use another ephemeral authenticator arrangement, for obtaining credential information from the credential manager 30. The agent may also retrieve an ephemeral authenticator from its memory, for example from a volatile memory. It shall be appreciated that an agent is not necessary in all implementations.

The agent 15 can use the created ephemeral keypair or the like to acquire a certificate which also has a limited lifetime. The acquired certificate with limited lifetime is then used for access request to the host. Thus the access procedure may involve two layers of lifetime limitations.

An ephemeral keypair, or other ephemeral authenticators, can be created such that the created authenticator can be used only once, or the authenticator can have a relatively short validity period. A condition can be that it can only be used for the lifetime of the associated certificate. It may also be defined that the ephemeral keypair or another authenticator cannot be stored on a non-volatile memory. The lifetime of the agent may be limited. Thus the user device may create in-memory thereof ephemeral keys which are used only once for one authentication operation, or for a limited time (e.g. all authentication operations during a five minute window), or the lifetime of the agent or certificate.

Figure 2:
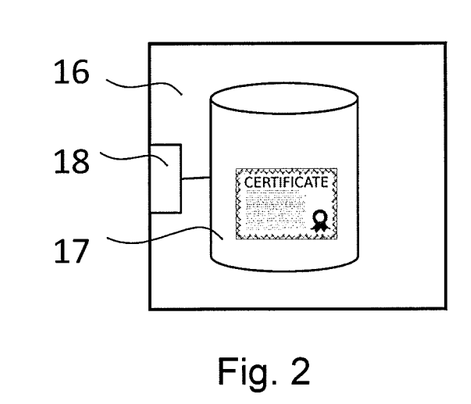
FIG. 2 shows schematically certain functional components of a virtual smart card entity.

A schematic illustration of certain functional components of a virtual smart card data entity 16 is presented in FIG. 2. A VSC entity can comprise a credential storage 17 and at least one interface 18 for input of credential information received by the client host apparatus from the credential management server. The arrangement is such that credential information stored in the credential storage is configurable according to credential information requested and received from the credential management server. The virtual smart card entity is configured for use by the user device 10 in association with sending a request for access to the at least one service by the service providing apparatus 20, the server apparatus 20 interfacing the credential management server 30.

A virtual smart card (VSC) entity thus provides a software based replacement for a physical smart card. The VSC can contain a keypair and a certificate. It is also possible that a VSC contains several keypairs and one or several certificates per a keypair. The certificate is created at the CA and it contains the public key of the VSC keypair as part of the certificate.

Figure 5:
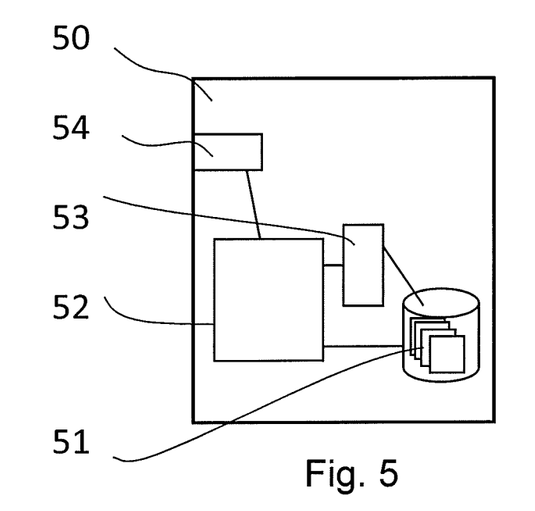
FIG. 5 shows data processing apparatus.

The functional components for handling the VSC can be provided by a data processing apparatus as shown in FIG. 5.

FIG. 1 shows further an access granting entity 21 provided in the host server apparatus 20. The access granting entity comprises at least one interface for receiving, from client apparatuses, requests for access to at least one service provided by the server apparatus 20. The interface is further for receiving, from the credential management server 30, credential information. The server apparatus comprises at least one processor and at least one memory including computer program code to implement the access granting functions. The at least one memory and the computer program code are configured, with the at least one processor, to process requests for accesses, the requests comprising virtual smart card data entities that have been configured for access control according to credential information provided by the credential management server to the client computer apparatus. The processing can comprise comparing the credential information on the virtual smart card data entity to credential information received by the access granting node from the credential management server to determine whether to grant the request for access. Further, the public key of the client apparatus may be checked.

According to a possibility the comparison is based on the most recent credential information received from the credential management server. The access handling entity can be configured to trust certificates issued by the credential management server. It can be further configured to monitor for use restrictions on the virtual smart cards. It may also request the client to prove that has the private key 33 of the private key—public key pair.

Figure 3:
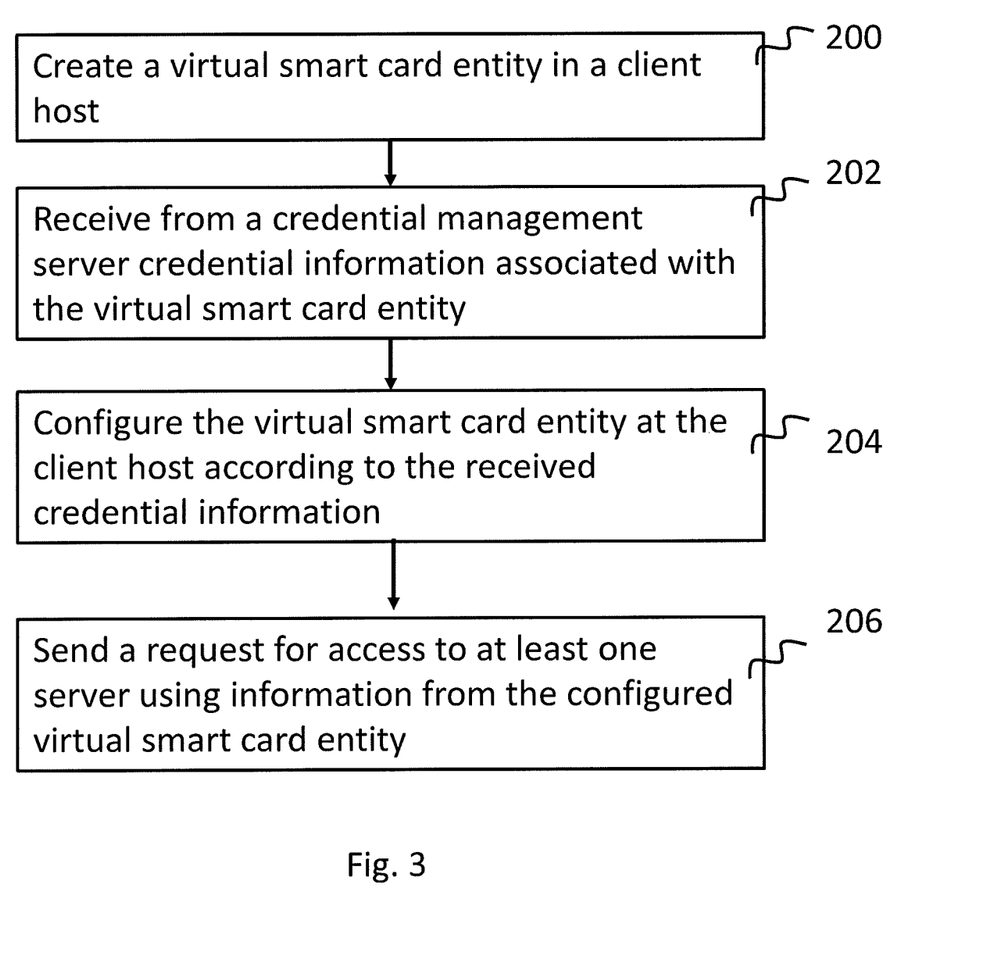
FIG. 3 shows a flowchart in accordance with an aspect.

FIG. 3 shows an example of a method performed at a client host for enabling secure access for the client host in a computer network according to the flow based virtual smart card operation of the current invention. In the method a virtual smart card entity is created at 200 in the client host to enable secure access to at least one server host. The client hosts can request credential information from a credential manager to obtain credential information for configuration of the virtual smart card entity for a particular access request. At this stage the client host may need to authenticate itself to the credential manager.

The client host receives at 202 from a credential management server the requested credential information associated with the virtual smart card entity. The virtual smart card entity can then be configured at 204 according to the received credential information.

After the configuration the client host can request at 206 for access to the at least one server host, the request being sent together with information based on the configured virtual smart card entity to an access granting entity interfacing the credential management server.

A virtual smart card (VSC) entity can be configured to contain at least one keypair and at least one certificate to provide a software based replacement for a physical smart card. The certificate can be created at a certificate authority (CA) and can contain the public key of the keypair of the VSC as a part of the certificate. The user device can then send the certificate configured in the VSC to the target server. During the authentication process, the target server can request the user device a proof of having the corresponding private key. This can be done by sending a signing request to the user device for which the VSC responds by computing a signature using its private key. This signature corresponds to the public key that was earlier sent in the certificate.

The arrangement enables dynamic requesting of credential information each time there is a need to send an access request. Authenticators used for requesting credential information and/or the credentials can be ephemeral such that the credentials can be used for an access request only for a relatively short period of time. A request for access involves the step of obtaining, from a certificate manager, the certificate information first and use thereof for configuration of a virtual smart card entity at a user device rather than using a certificate already stored in the user device.

Figure 4:
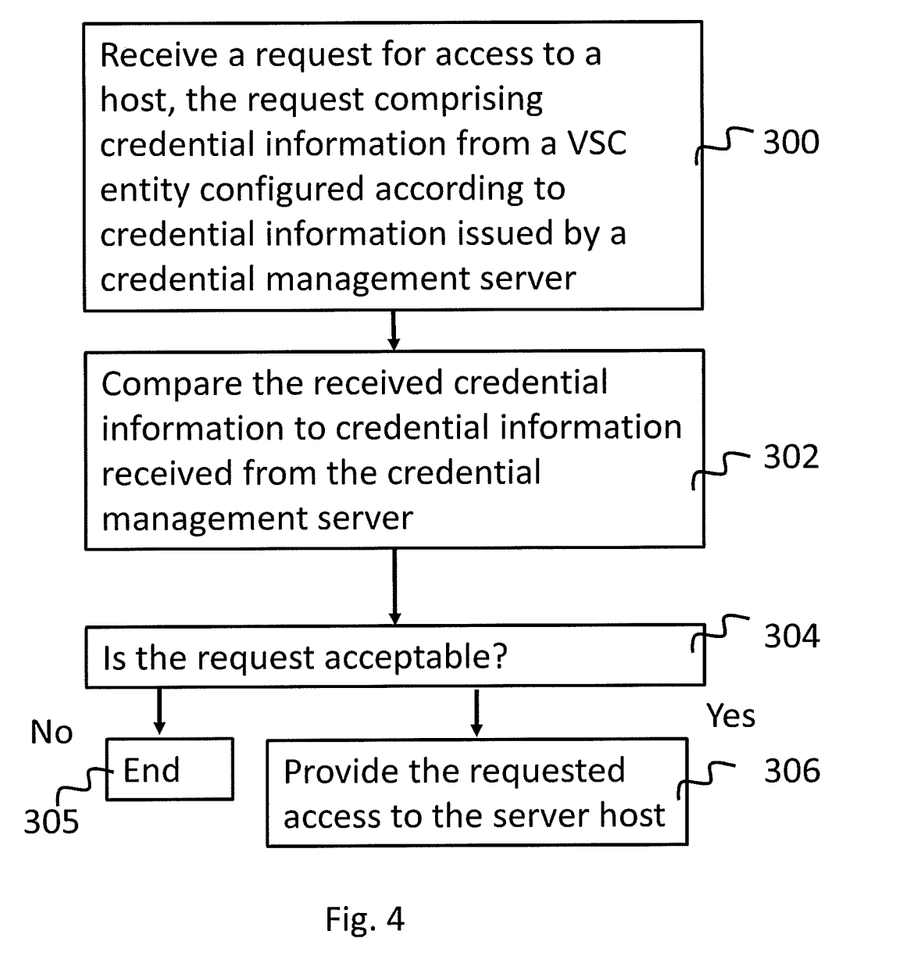
FIG. 4 shows a flowchart in accordance with the yet another aspect.

FIG. 4 shows an example of operation at the target server host for granting access in response to a request containing a data entity created based on information obtained from the virtual smart card (VSC) entity configured at the client host. The method comprises receiving at 300, from the client host, a request for access to the server host. The request comprises credential information based on the virtual smart card data entity configured for access control according to credential information issued by the credential management server, as explained above. The credential information on the virtual smart card data entity can be compared at 302 to trusted credential information to determine at 304 whether to grant the request for access. The trusted credential information may have been received from the credential management server via a domain controller of the target network.

If the outcome of determination at 304 is that the access shall be denied because the information on the virtual smart card data entity does not agree with the information from the credential management server, or the determination was negative for any other reason, the access can be denied and the operation ends at 305. A predefined control action may also be taken. For example, a system administrator and/or the service provider may be informed of the attempt to access the service.

If the determination result is positive, the request for access can be granted at 306 and the handling thereof proceed at the server host.

FIG. 5 shows an example of data processing apparatus for providing necessary data processing functions to implement the above described virtual smart cards and processing thereof. The data processing apparatus 50 can be for example integrated with, coupled to and/or otherwise arranged for controlling the user device 10 of FIG. 1. The data processing apparatus can also be provided at the server apparatus 20 of FIG. 1 and/or implementing any of the agents in FIG. 1. The data processing apparatus 50 can be further arranged to provide control on communication sessions, authenticators and any additional information. In addition to the functions described above, the control apparatus can be configured to provide control functions in association with operations such as authentications with requesting devices, security devices, and hosts, decryption of data, signalling and data communication operations. A data processing apparatus can determine which key(s) or other authenticators and credentials are needed for the access and other control operations. For these purposes the control apparatus comprises at least one memory 51, at least one data processing unit 52, 53 and at least one input/output interface 54. Via the interface the apparatus can be coupled to other entities of the respective device. The control apparatus can be configured to execute an appropriate software code to provide the control functions. The control apparatus can also be interconnected with other control entities. Means for providing an intermediate security function in a computer network between hosts and devices capable of accessing the hosts can comprise an appropriate data processing and interface arrangement.

According to an aspect a client host can comprise means for providing a virtual smart card entity so as to enable the client host to request for access to at least one service provider host in the computer network, to receive, from a credential management server, credential information associated with the virtual smart card entity, to configure the virtual smart card entity according to the received credential information, and to send a request for access to the at least one service provider host using the configured virtual smart card entity.

The means can be adapted to handle credential information comprising a certificate issued by a certificate authority. The credential information may comprise at least one use restriction on a credential. For example, the credential information may be arranged such that use of a credential in relation to one of lifetime of the credential is limited. Other exemplifying limitations relate to the number of times the credential can be used, geographical location of use of the credential, IP address associated with the use of the credential, time of use of the credential, type of the request for access where the credential is used, and type of the service requested using the credential.

The means can be configured to send the credential information from the configured virtual smart card entity to the at least one service provider host. A public key associated with the data processing apparatus may be delivered with the credential information to the at least one service provider host.

The means may be configured to use at least one authentication parameter for authentication to the credential management server to obtain said certificate information from the credential management server. The at least one authentication parameter may be ephemeral. An ephemeral key pair may be generated for the authentication.

The means can be configured to request for credential information from the credential management server for each new request for access.

Time limited authenticators and time limited certificates may be used for requests for access.

The control means may create and/or retrieve an ephemeral or otherwise restricted credential. Memory means for storing ephemeral credentials may also be provided. The control means may retrieve an ephemeral credential from the memory means in response to receiving an access request.

An ephemeral credential may comprise a public key. A certificate or another authenticator created in response to an ephemeral credential may include at least part of the public key part of the ephemeral credential. The operation may be based on use of an ephemeral keypair and at least one more permanent authenticator.

The various embodiments and their combinations or subdivisions may be implemented as methods, apparatuses, or computer program products. According to an aspect at least dome of the functionalities are provided in virtualised environment. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. At least some of the processing and/or hosts can be provided in virtualised environment.

A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in various combinations in, as non-limiting examples, hardware, software, firmware, special purpose circuits or logic, general purpose hardware or controller or other computing devices, or some combination thereof.

A centralized and scalable access management solution may be provided for elastic cloud environments. Access right updates can be made instantaneously. Per-host changes may not be required. Certain aspects support both interactive and non-interactive (machine-to-machine) connections.

The various aspects and features discussed above can be combined in manners not specifically shown by the drawings and/or described above.

The foregoing description provides by way of exemplary and non-limiting examples a full and informative description of exemplary embodiments and aspects of the invention. However, various modifications and adaptations falling within the spirit and scope of this disclosure may become apparent to those skilled in the relevant arts in view of the foregoing description, when read in conjunction with the accompanying drawings and the appended claims.

What is claimed is:

1. A data processing apparatus for a user device for use in a computer network, the data processing apparatus comprising at least one processor, and at least one memory including computer program code, wherein the at least one memory and the computer program code are configured, with the at least one processor, to:

create a virtual smart card entity at the user device and configure the created virtual smart card entity according to first security credential information to have a first security credential configuration to enable a user of the user device to request for access to one or more remote service provider hosts in the computer network, determine a new request for access to the at least one remote service provider host in the computer network, in response to the determined new request for access to the at least one remote service provider host, request second security credential information for reconfiguration of the created virtual smart card entity from a credential management server to have a second security credential configuration for the new request for access to the at least one remote service provider host via the computer network, receive, at the user device from the credential management server, the requested second security credential information for reconfiguration of the created virtual smart card entity for the new request for access to the at least one remote service provider host, wherein the second security credential information restricts at least one of a number of times a security credential can be used or a lifetime of the security credential, reconfigure the created virtual smart card entity having the first security credential configuration at the user device to have the second security credential configuration according to the received second security credential information for the new request for access to the at least one remote service provider host, send the new request for access from the user device to the at least one remote service provider host using the reconfigured virtual smart card entity having the second security credential configuration, and subsequent to acceptance of the new request for access by the at least one remote service provider host based on the reconfigured virtual smart card entity having the second security credential configuration, communicate via the computer network with the at least one remote service provider host.

2. The data processing apparatus of claim 1, wherein the second security credential information comprises a security certificate issued by a certificate authority.

3. The data processing apparatus of claim 2, configured to send the security certificate in the new request for access from the reconfigured virtual smart card entity to the at least one remote service provider host.

4. The data processing apparatus of claim 3, configured to send a public key associated with the data processing apparatus with the security certificate to the at least one remote service provider host.

5. The data processing apparatus of claim 1, wherein the second security credential information comprises at least one further use restriction on the security credential.

6. The data processing apparatus of claim 5, wherein the second security credential information is further arranged to restrict use of the security credential in relation to at least one of a geographical location of the use of the security credential, an IP address associated with the use of the security credential, a time of the use of the security credential, a type of a request for access where the security credential is used, or a type of a service requested using the security credential.

7. The data processing apparatus of claim 1, configured to use at least one authentication parameter for authentication to the credential management server to obtain the second security credential information from the credential management server.

8. The data processing apparatus of claim 7, wherein the at least one authentication parameter is ephemeral.

9. The data processing apparatus of claim 7, configured to generate an ephemeral key pair for the authentication.

10. The data processing apparatus of claim 1, configured to use time limited authenticators and time limited security certificates for requests for access.

11. A data processing apparatus for a user device for use in a computer network, the data processing apparatus comprising at least one processor, and at least one memory including computer program code, wherein the at least one memory and the computer program code are configured, with the at least one processor, to:

create a virtual smart card entity at the user device to enable a user of the user device to request for access to one or more remote service provider hosts in the computer network, wherein the virtual smart card entity has a first security certificate configuration according to first security credential information for securing one or more requests for access, in response to a new request for access to at least one remote service provider host in the computer network, request for second security credential information from a certificate authority server for reconfiguration of the created virtual smart card entity having the first security certificate configuration to have a second security certificate configuration according to the second security credential information for securing the new request for access to the at least one remote service provider host via the computer network, receive, at the user device from the certificate authority server, the requested second security credential information for reconfiguration of the created virtual smart card entity having the first security certificate configuration to have the second security certificate configuration for securing the new request for access to the at least one remote service provider host via the computer network, reconfigure the created virtual smart card entity at the user device to have the second security certificate configuration according to the received second security credential information for securing the new request for access to the at least one remote service provider host via the computer network, send the new request for access from the user device via the computer network to the at least one remote service provider host using the virtual smart card entity reconfigured to have the second security certificate configuration according to the received second security credential information for securing the new request for access to the at least one remote service provider host, and subsequent to acceptance of the new request for access by the at least one remote service provider host based on the reconfigured virtual smart card entity having the second security certificate configuration, communicate via the computer network with the at least one remote service provider host.

12. A non-transitory computer program product stored on a computer-readable medium comprising computer-readable program code operable to cause a user device to create a virtual smart card entity at the user device having a first security credential configuration according to first security credential information, wherein the computer program product is configured to cause reconfiguration of the created virtual smart card entity for access control in a computer network and to provide:

a security credential information storage, and at least one interface for input of second security credential information for reconfiguration of the created virtual smart card entity having the first security credential configuration to have a second security credential configuration according to the second security credential information received by the user device from a credential management server in response to a request, from the user device to the credential management server in response to a new request for access to one or more remote service provider servers by the user device, for the second security credential information, wherein a security credential configuration of the virtual smart card entity is reconfigurable according to security credential information obtained from the credential management server for each new request for access to at least one remote service provider server in the computer network, wherein the received second security credential information restricts at least one of a number of times a security credential can be used or a lifetime of the security credential, wherein the created virtual smart card entity is reconfigurable based on the received second security credential information to have the second security credential configuration for use by the user device in association with sending the new request for access to the at least one remote service provider server, and wherein, subsequent to acceptance of the new request for access by the at least one remote service provider server based on the reconfigured virtual smart card entity having the second security credential configuration, communication via the computer network with the at least one remote service provider server is enabled.

13. The non-transitory computer program product of claim 12, wherein the received second security credential information comprises a certificate issued by a certificate authority and the security credential information storage is configurable to store a latest certificate received from the certificate authority in response to a request for a certificate by the user device.

14. The non-transitory computer program product of claim 12, wherein the received second security credential information comprises at least one further use restriction on the security credential.

15. The non-transitory computer program product of claim 14, wherein the received second security credential information is arranged to further restrict use of the security credential in relation to at least one of a geographical location of the use of the security credential, an IP address associated with the use of the security credential, a time of the use of the security credential, a type of a request for access where the security credential is used, or a type of a service requested using the security credential.

16. The non-transitory computer program product of claim 12, wherein the created virtual smart card entity comprises information of at least one key.

17. A method for access control in a computer network, the method comprising:
    creating a virtual smart card entity and configuring the created virtual smart card entity to have a first security credential configuration according to first security credential information in a user device to enable secure access to one or more remote service provider hosts in the computer network,
    determining a new request for access to at least one remote service provider host in the computer network,
    requesting, by the user device from a credential management server in response to the new request for access, for second security credential information for reconfiguration of the created virtual smart card entity having the first security credential configuration to have a second security credential configuration according to the second security credential information for the new request for access to the at least one remote service provider host,
    receiving, at the user device from the credential management server, the requested second security credential information for reconfiguration of the created virtual smart card entity to have the second security credential configuration for the new request for access to the at least one remote service provider host and restricting at least one of a number of times a security credential can be used or a lifetime of the security credential,
    reconfiguring the created virtual smart card entity at the user device to have the second security credential configuration for the new request for access to the at least one remote service provider host according to the received second security credential information,
    sending from the user device the new request for access to the at least one remote service provider host using the second security credential information from the reconfigured virtual smart card entity having the second security credential configuration, and
    subsequent to acceptance of the new request for access by the at least one remote service provider host based on the reconfigured virtual smart card entity having the second security credential configuration, communicating via the computer network with the at least one remote service provider host.

18. The method of claim 17, wherein the requesting comprises requesting for the second security credential information from a certificate authority.

19. The method of claim 17, comprising applying a further limitation on use of the security credential in the reconfigured virtual smart card entity, the further limitation comprising at least one of a geographical location of the use of the security credential, an IP address associated with the use of the security credential, a time of the use of the security credential, a type of a request for access using the security credential, or a type of a service requested using the security credential.

20. The method of claim 17, comprising sending the second security credential information from the reconfigured virtual smart card entity to the at least one remote service provider host together with a public key associated with a data processing apparatus.

21. The method of claim 17, comprising using at least one ephemeral authentication parameter for authentication to the credential management server to obtain the second security credential information from the credential management server.

22. The method of claim 21, comprising generating an ephemeral key pair for the authentication.

23. A method for access control in a computer network, the method comprising:
    creating a virtual smart card entity in a user device to enable secure access to one or more remote service provider hosts in the computer network,
    configuring the created virtual smart card entity according to first security credential information to have a first security certificate configuration for securing a request for access to one or more remote service provider hosts in the computer network,
    in response to a new request for access to at least one remote service provider host in the computer network, requesting, by the user device, for second security credential information from a certificate authority server for reconfiguration of the created virtual smart card entity having the first security certificate configuration to have a second security certificate configuration for securing the new request for access,
    receiving, at the user device from the certificate authority server, the requested second security credential information for reconfiguration of the created virtual smart card entity to have the second security certificate configuration for securing the new request for access to the at least one remote service provider host,
    reconfiguring the created virtual smart card entity at the user device to have the second security certificate configuration according to the received second security credential information for securing the new request for access to the at least one remote service provider host,
    sending from the user device the new request for access to the at least one remote service provider host via the computer network,
    securing the new request for access using a security certificate from the virtual smart card entity reconfigured to have the second security certificate configuration in response to the new request for access to the at least one remote service provider host via the computer network, and subsequent to acceptance of the new request for access by the at least one remote service provider host based on the reconfigured virtual smart card entity having the second security certificate configuration, communicating via the computer network with the at least one remote service provider host.

24. A non-transitory computer readable media comprising program code causing a processor to perform instructions of a security method in a user device requesting for access in a computer network, the security method comprising:

creating a virtual smart card entity in the user device to enable secure access to one or more remote service provider hosts in the computer network, configuring the created virtual smart card entity according to first security credential information to have a first security certificate configuration for securing a request for access to one or more remote service provider hosts in the computer network, in response to a new request for access to at least one remote service provider host in the computer network, requesting, by the user device from a certificate authority server, for second security credential information for reconfiguration of the created virtual smart card entity having the first security certificate configuration to have a second security certificate configuration for securing the new request for access, receiving, by the user device from the certificate authority server, the requested second security credential information for reconfiguration of the created virtual smart card entity to have the second security certificate configuration for securing the new request for access to the at least one remote service provider host and restricting at least one of a number of times a security credential can be used or a lifetime of a security credential, reconfiguring the created virtual smart card entity at the user device to have the second security certificate configuration for securing the new request for access to the at least one remote service provider host via the computer network according to the received second security credential information, sending from the user device the new request for access to the at least one remote service provider host via the computer network, securing the new request for access using a security certificate from the reconfigured virtual smart card entity having the second security certificate configuration in response to the new request for access to the at least one remote service provider host via the computer network, and subsequent to acceptance of the new request for access by the at least one remote service provider host based on the reconfigured virtual smart card entity having the second security certificate configuration, communicating via the computer network with the at least one remote service provider host.

* * * * *

UNITED STATES PATENT AND TRADEMARK OFFICE
CERTIFICATE OF CORRECTION

PATENT NO. : 11,095,638 B2
APPLICATION NO. : 15/837271
DATED : August 17, 2021
INVENTOR(S) : Rossi Page 1 of 1

It is certified that error appears in the above-identified patent and that said Letters Patent is hereby corrected as shown below:

On the Title Page

On Page 2, Column 2, item (56) under Other Publications, Line 12:
Please delete "Autehntiocation" and insert --Authentication--

On Page 2, Column 2, item (56) under Other Publications, Line 18:
Please delete "Autheniticatjon" and insert --Authentication--

On Page 2, Column 2, item (56) Other Publications, Line 30:
Please delete "Aritcle" and insert --Article--

In the Claims

Column 10, Claim 1, Line 48:
Please delete "access to the at least" and insert --access to at least--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*